March 31, 1964

R. G. STEPHENS 3,127,465

THREE-PHASE INTERFEROMETER

Filed Jan. 16, 1961

RICHARD G. STEPHENS
INVENTOR

BY *Richard G. Stephens*

ATTORNEY

United States Patent Office 3,127,465
Patented Mar. 31, 1964

3,127,465
THREE-PHASE INTERFEROMETER
Richard G. Stephens, Binghamton, N.Y., assignor to General Precision, Inc., Binghamton, N.Y., a corporation of Delaware
Filed Jan. 16, 1961, Ser. No. 82,955
6 Claims. (Cl. 88—14)

My invention relates to measuring devices adapted to measure linear distances in units which are equal to the wavelength of light of a certain selected color. Since the wavelength of monochromatic light is a very accurate standard of length, extremely precise measurements may be made by interference methods. Apparatus is known to the prior art in which absolute measurements may be made by counting interference fringes. More specifically, my invention relates to improved measuring apparatus of such type in which interference fringes are counted by means of a "three-phase" electric counter such as that disclosed in my United States Patent No. 2,835,445, issued May 20, 1958. Patent 2,604,004, granted to Elihu Root III, shows an interferometric measuring device having a reversible, direct-coupled "two-phase" electronic and mechanical counter for making an absolute count of interference fringes. The use of various other improved counters with the Root device has been attempted, and considerable improvements in reliability and cost have been obtained by using the Root device with a "two-phase" counter of the type shown in United States Patent No. 2,833,476, issued to Hayes and West, May 6, 1958. My abovementioned patent described a fast, reliable and economically constructed improvement over the Hayes and West device, and hence it becomes desirable to provide interferometric measuring apparatus which produces proper signals to operate my new and improved three-phase counter.

The abovementioned Root device employs as a light phase-shifting element a reflecting surface having discrete steps one-eighth of a wavelength apart. Such steps are commonly made by evaporation of aluminum on glass, and needless to say, provision of a step exactly one-eighth of a wavelength of the light utilized is an operation requiring extreme precision. By utilization of larger steps in my invention (i.e., one sixth of a wavelength) such reflecting elements may be more easily fabricated, and phase shifters constructed according to my invention will be less susceptible to small constructional imperfections.

It therefore becomes an object of my invention to provide new and improved interferometric measuring apparatus.

It is a further object of my invention to provide an improved interferometric measuring apparatus in which the light phase shifting means is easier to fabricate.

It is yet another object of my invention to provide an improved interferometric measuring apparatus which may be used in conjunction with three-state reversible counters of the type shown in my above cited U.S. patent, which counters are faster, and more reliable than those hitherto used in interferometric measuring devices.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings in which.

Figure 1:
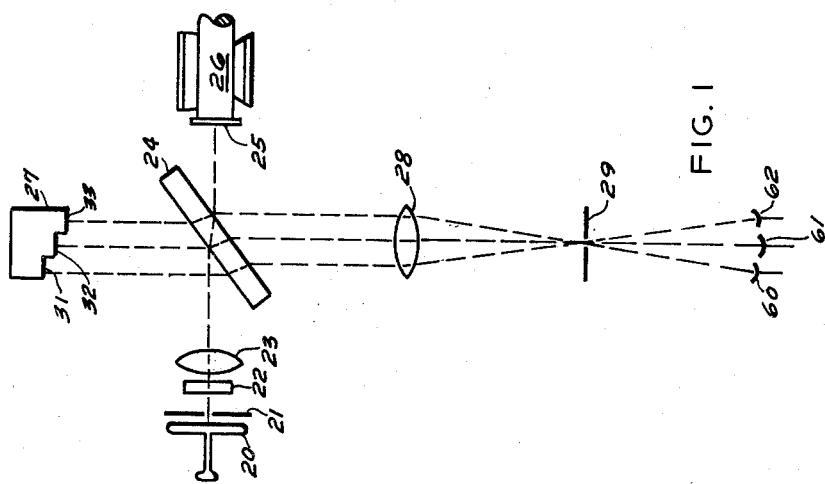
FIG. 1 shows the optical portion of an interferometric measuring device according to my invention.

Referring to FIG. 1, there is shown at 20 a light source capable of emitting sharp spectral lines, such as a krypton discharge tube. Light from source 20 passes through a small aperture in a mask or diaphragm 21, through monochromating filter 22 and collimating lens 23 to impinge upon beam-splitter 24. Light passing through beam-splitter 24 is reflected by mirror 25, or other retroreflector means, such as a triple mirror, cube-corner prism, etc., mounted on movable measuring head 26 back toward beam-splitter 24, where it is again reflected to stigmating lens 28.

The customary definition of a retroreflector will be used in this disclosure, namely a component possessing the property of reflecting incident radiation such that the angle of deviation is substantially equal to 180° for all angles of incidence within its useful field, and having the property of being substantially free from optical aberrations for the circumstances in which it is utilized. To retroreflect is to reflect with a deviations angle of 180°.

That portion of the light initially reflected by beam-splitter 24 is reflected by phase shifting element 27, which is fixed in relation to the mirror 24, and which has three discrete reflecting surfaces preferably one-sixth of a wavelength apart. It will become apparent as the description proceeds that the three surfaces need not be one-sixth wavelength apart, but may be odd sixths wavelengths apart. It will become apparent to those skilled in the art that the stepped-mirror phase shifting element 27 may be replaced by a planar mirror carrying, preferably, one-sixth wavelength phase retarding coatings formed by vacuum evaporation of some such substance as magnesium fluoride, or multiple one-sixth wavelength coatings; or by such coatings interposed anywhere in one of the split light beams, in which case said coatings will be carried upon a separate piece, or pieces, of optically flat glass; or by any other retroreflector, such as a cube-corner prism with said coatings disposed on its active transparent, beam-splitter adjacent surface, or on a separate, optically flat glass, or glasses, as noted above; or by many combinations of the above mentioned and many other known alternative means. For convenience, however, the stepped-mirror embodiment will be described herein. In the Root patent referred to similar surfaces are provided which are one-eighth wavelength apart. Since one-sixth wavelength represents a larger physical step, or greater coating thickness, than one-eighth wavelength, the building of the steps, or coatings, requires less precision, and imperfections in the phase shifting element of the invention cause less trouble.

Light directed toward the three surfaces is reflected back toward beam-splitter 24 in three beams having a one-third wavelength phase difference. The three beams pass through beam-splitter 24 to the objective lens 28 along with the light reflected from movable mirror 25. The combined light beams can be thought of as producing, between beam-splitter 24 and photo-sensitive means 60, 61, 62, three standing waves of light energy which move with retroreflector 25 and differ in space phase by amounts determined by phase shifting device 27. Objective lens 28 focuses the light through a small aperture in disk 29. The aperture of disk 29 acts, with lenses 23 and 28, and disk 21, as a monochromator, and should be large enough to pass only one spectral line. The light passing through the aperture of disk 29 impinges upon a trio 60, 61, 62 of photosensitive devices, for instance, photomultipliers.

The light reflected from the three discrete surfaces will either reinforce or interfere with the light reflected from mirror 25, and as movable head 26 and mirror 25 are moved through a distance of one-half wavelength, each of the beams will increase and decrease in a sinusoidal manner through one cycle. Since the three light beams reflected from the discrete surfaces are approximately 120 degrees displaced in phase, the light striking the three photosensitive devices cause 120° displaced potentials to be generated by the photosensitive devices, producing a three-phase voltage.

Figure 2:
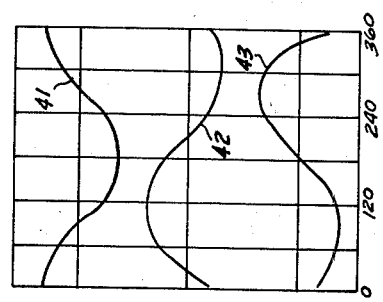
FIG. 2 shows a portion of the electrical system of an interferometric measuring device according to my invention.

Shown in FIG. 2 are three sine waves 41, 42, 43 displaced 120° in phase representing the intensity of the light applied to the trio of photosensitive devices and the output potential of said devices.

Figure 3:
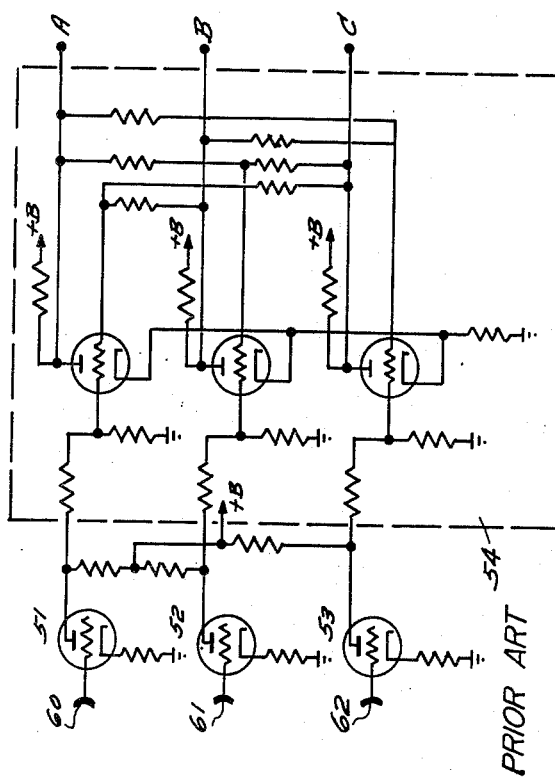

As shown in FIG. 3, the output terminals of each of the photoelectric tubes (e.g., photomultiplier tubes) are directly connected to the grid of a conventional amplifier tube, 51, 52, 53, serving to strengthen the photocell outputs and to create three "voltage" outputs rather than "current" outputs. The amplifier output potentials are applied to the input terminals of a tri-stable device 54 in accordance with my abovementioned patent, 2,835,445, and the output terminals A, B, C of said tri-stable device are connected to operate the improved counting circuit illustrated of FIG. 5 thereof.

It will thus be seen that the objects set forth above, among those made apparent from the preceding description, are efficiently attained. Since certain changes may be made in carrying out the above method and in the construction set forth without departing from the scope of the invention, it is intended that all matter contained in the above description or shown in the accompanying drawings shall be interpreted as illustrative and not in a limiting sense.

It is particularly noted that, while the above embodiment of the invention has been described in terms of linear measurement, the invention is also adapted to interferometric devices for the measurement of angle, for time standard comparison, and for measuring the deviation angles of optical wedges and cube-corner prisms and checking the parallelism of the faces of optical flats.

It is also to be understood that the following claims are intended to cover all of the generic and specific features of the invention herein described, and all statements of the scope of the invention fall therebetween.

Having described my invention, what I claim as new and desire to secure by Letters Patent is:

1. An interferometer comprising,
    (a) a beam-splitter means operable to provide from an incident light beam a pair of light beams;
    (b) retroreflector means positioned in the optical path of one of said pair of light beams;
    (c) phase-shifting means positioned in the optical path of said one of said pair of light beams effective to shift unequally the phase of at least two portions of said beam with respect to the remaining portion thereof, the first of said two portions being shifted by $n/6$ wavelengths and the second of said two portions being shifted by $2n/6$ wavelengths wherein $n$ is an add integer; and
    (d) means for imaging the separate fields of illumination produced by recombining said phase-shifted portions of said one of said pair of light beams and said remaining portion thereof with the other of said pair of light beams at said beam-splitter means upon a corresponding plurality of photo-devices each of which is substantially continuously responsive to one of said separate fields of illumination.

2. An interferometer comprising,
    (a) beam-splitter means operable to provide from an incident light beam a pair of light beams;
    (b) retroreflector means positioned in the optical path of one of said pair of light beams;
    (c) phase-shifting means positioned in the optical path of said one of said pair of light beams effective to unequally shift the phase of two portions of said beam with respect to the remaining portion of said beam, the phase-shift imparted to one of said two portions being 1/6 wavelength and the phase shift imparted to the other portion being 2/6 of wavelength;
    (d) first, second, and third photoresponsive means each of which is substantially continuously responsive to an individual one of said portions of said one of said pair of light beams and the other of said pair of light beams for providing first, second, and third electrical signals; and
    (e) conversion circuit means operable to substantially continuously compare said first, second, and third electrical signals and to actuate counter means in response to said comparison.

3. An interferometric method comprising,
    (a) splitting a beam of light into first and second split beams,
    (b) retroreflecting at least one of said first and second split beams;
    (c) retarding the phase of one portion of said first split beam 120° and of another portion of said first split beam 240° each with respect to the remaining portion of said first split beam;
    (d) recombining said first and second split beams to form three standing waves of light energy; and
    (e) detecting the relative phase occurrence of said one portion, said another portion, and said remaining portion.

4. Measuring apparatus comprising,
    (a) a movable test member whose net change of position is to be measured;
    (b) retroreflector means;
    (c) means securing said retroreflector means contiguously with said movable test member;
    (d) means for forming by interference at least three out of phase standing waves the amplitude of each at any fixed point being determined by the position of said test member;
    (e) each of said at least three standing waves being spatially 120° and 240° out of phase with respect to the remaining standing waves, respectively; and
    (f) means for detecting the phase relationship and number of said standing waves including at least first, second, and third photoresponsive means each of which is substantially continuously responsive to one of said waves.

5. Measuring apparatus comprising a reversibly movable member whose net change of position is to be measured, retroreflecting means contiguous with said movable member, optical means including a reflecting member having first, second and third reflecting surfaces separated by one-sixth of a wave length for forming by interference at least three fields of illumination whose intensities vary cyclically as a function of the position of the movable member, the variations of said at least three fields being out of phase so that transitions through complete intensity ranges occur for said at least three fields in different position regions of said member, whereby the position of said member is a function of the states of said fields, and the position of said member is uniquely determined by the net number of changes of state of said fields, and means for substantially continuously detecting said variations.

6. Measuring apparatus comprising a reversibly movable member whose net change of position is to be measured, retroreflection means contiguous with said member, optical means including a reflecting member having first, second and third reflecting surfaces separated by one-sixth of a wave length for forming by interference three fields of illumination whose intensities vary cyclically as a function of position of the movable member, the variations of the three fields being out of phase so that transitions through complete intensity ranges occur for the three fields in different position regions of said member, whereby the position of said member is a function of the states of said three fields and the position of said member is uniquely determined by the net number of changes of state of said three fields, and means for substantially continuously detecting said variations.

References Cited in the file of this patent

UNITED STATES PATENTS 2,604,004  Root _____ July 22, 1952

FOREIGN PATENTS 465,365  Germany _____ Sept. 15, 1928

OTHER REFERENCES

Candler: Modern Interferometers, published by Hilger and Watts Ltd., 1951, pp. 115–121 relied on.

Schultz: The Effect of Phase Changes in White Light Interferometry, Journal of the Optical Society of America, vol. 41, No. 4, April 1951, pp. 261–264.